US007835347B2

(12) United States Patent  (10) Patent No.: US 7,835,347 B2
Guo  (45) Date of Patent: Nov. 16, 2010

(54) IP INTER-WORKING GATEWAY IN NEXT GENERATION NETWORK AND METHOD FOR IMPLEMENTING INTER-WORKING BETWEEN IP DOMAINS

(75) Inventor: Dong Guo, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 353 days.

(21) Appl. No.: 11/675,115

(22) Filed: Feb. 15, 2007

(65) Prior Publication Data

US 2007/0211738 A1  Sep. 13, 2007

Related U.S. Application Data

(63) Continuation of application No. PCT/CN2006/001052, filed on May 22, 2006.

(30) Foreign Application Priority Data

Sep. 30, 2005  (CN) .................. 2005 1 0112529

(51) Int. Cl.
 H04L 12/66 (2006.01)
 H04L 12/28 (2006.01)
 H04J 3/16 (2006.01)
(52) U.S. Cl. .............. 370/352; 370/389; 370/395.52; 370/401; 370/466
(58) Field of Classification Search .............. None
 See application file for complete search history.

(56) References Cited

U.S. PATENT DOCUMENTS

| 6,731,632 | B1 | 5/2004 | Takahashi et al. | |
|---|---|---|---|---|
| 7,724,780 | B2 * | 5/2010 | Baird et al. | 370/509 |
| 2002/0176404 | A1 * | 11/2002 | Girard | 370/352 |
| 2003/0048795 | A1 | 3/2003 | Pinault | |
| 2003/0177125 | A1 * | 9/2003 | Loukianov | 707/10 |
| 2004/0266426 | A1 * | 12/2004 | Marsh et al. | 455/426.2 |

(Continued)

FOREIGN PATENT DOCUMENTS

CN  1543152  11/2004

(Continued)

OTHER PUBLICATIONS

European Search Report dated Apr. 7, 2009; Application No./Patent No. 06741940.8-2413 / 1931093 PCT/CN2006001052.

Primary Examiner—Huy D Vu
Assistant Examiner—Brandon Renner
(74) Attorney, Agent, or Firm—Finnegan, Henderson, Farabow, Garrett, Dunner LLP

(57) ABSTRACT

An IP inter-working gateway in an NGN includes: a transport layer module which complies with the definition of a standard TCP/IP protocol stack, for determining a service type of an IP packet from a source IP domain, and transmitting the IP packet to a service module or to a destination IP domain; the service module, for performing processing of signalling proxy, RTCP and media conversion and/or processing of control protocol for the IP packet from the transport layer module, and transmitting the IP packet processed by the service module to the destination IP domain. The embodiments of the present invention provides a method for implementing inter-working between IP domains by the IP inter-working gateway, which implements the inter-working of IP packet between heterogeneous operating networks.

27 Claims, 5 Drawing Sheets

U.S. PATENT DOCUMENTS

| | | | |
|---|---|---|---|
| 2005/0076108 A1* | 4/2005 | Li et al. | 709/223 |
| 2005/0094651 A1* | 5/2005 | Lutz et al. | 370/401 |
| 2005/0128943 A1* | 6/2005 | Gibbs et al. | 370/229 |
| 2006/0025141 A1* | 2/2006 | Marsh et al. | 455/445 |
| 2006/0171390 A1* | 8/2006 | La Joie | 370/390 |
| 2007/0047590 A1* | 3/2007 | Curcio et al. | 370/503 |
| 2009/0164655 A1* | 6/2009 | Pettersson et al. | 709/231 |

FOREIGN PATENT DOCUMENTS

| | | |
|---|---|---|
| KR | 20020043287 | 6/2002 |

* cited by examiner

IP INTER-WORKING GATEWAY IN NEXT GENERATION NETWORK AND METHOD FOR IMPLEMENTING INTER-WORKING BETWEEN IP DOMAINS

FIELD OF THE INVENTION

The present invention relates to the Next Generation Network (NGN), and more particularly, to an Internet Protocol (IP) inter-working gateway in the NGN and a method for implementing inter-working between IP domains.

BACKGROUND OF THE INVENTION

The traditional telecom network is a Public Switched Telephone Network (PSTN) based on Time Division Multiplex (TDM) circuit switching and mainly used to bear voice services. Along with the rapid increase of data services, it is more and more difficult for the traditional telecom network to provide enough bandwidth and deploy new services. In recent years, in order to meet the rising communication demands, the NGN whose core is an IP network has been rapidly developed and applied to fixed communications, mobile communications and the like, thereby providing abundant audio, data and image services.

FIG. 1 is a schematic diagram illustrating a structure of the conventional NGN. In FIG. 1, a softswitch controls a Media Gateway (MG) through H.248/Medium Gateway Control Protocol (MGCP) and the like. On the softswitch, such protocols as H.323/Bearer Independent Call Control (BICC)/Session Initiation Protocol (SIP) run as well. Signalling interactions are performed on the softswitch, while the MG performs resource allocation, e.g., the establishment of a service bearer, under the control of the softswitch.

In addition, in the packet network in FIG. 1, the IP packet network has gradually become a bearer network of the NGN. Generally, different operators have their own IP packet networks. Thus, there are a great number of interactions of IP packets between a mobile operating network, a fixed operating network, and a traditional Internet Service Provider (ISP) network. Additionally, there are also a great many of interactions of IP packets between different mobile operating networks, different fixed operating networks, and different ISP operating networks. In order to implement the interactions of various IP packets, i.e., inter-working, between IP domains, it is necessary to introduce appropriate device forms to solve such inter-working issues as the establishment of a bearer, encoding/decoding or packet format conversion, Network Address Translation (NAT) and its traversal, security, Quality of Service (QoS) and so on between IP domains. At present, neither a complete technique and a networking scheme nor real applications can realize the inter-working between IP domains, except that a few individual issues of IP inter-working have been solved.

FIG. 2 is a schematic diagram illustrating the networking of pure IP inter-working devices defined by the Europe Telecom Standard Institution (ETSI) in its TS102.333 protocol. Related standards of the ETSI defines functions which is implemented by using H.248 packet to control the MC by a gateway controller (i.e., a softswitch), which include: ① across-domain allocation of an IP end point, i.e., allocating a local IP end point and indicating which side's remote IP end point to inter-work with the local IP end point; ② filtering remote IP addresses and points generally by a pinhole firewall; ③ IP packet label, that is, adding a suitable value, such as that of a Virtual Local Area Network (VLAN), Differentiated Service Code Point (DSCP), Multi-Protocol Label Switching (MPLS) and so on, to an IP packet; ④ resources reservation; ⑤ NAT control.

As shown in FIG. 2, after receiving a call signalling from a user terminal, the gateway controller instructs, through H.248 message, the MG to allocate two local IP end points, i.e., T1 and T2, and perform bidirectional topology connection inside the MG. Then, the gateway controller instructs the two local IP end points to respectively establish a bearer with remote end points in two IP domains, for example, T1 inter-works with the IP end point in the IP access network and T2 inter-works with the IP end point in the IP core network so as to implement the inter-working between IP domains. The information of the IP end point includes an IP address and port number.

As noted above, ETSI TS102.33 and other related protocols make it possible that the gateway controller contorts the MG to perform the establishment of a bearer, filtering of a remote address and port, NAT, resource reservation for media flows in each IP domain, however, security issues caused by a user terminal sending the call signalling directly to the softswitch have not been invloved. Since the address information of the softswitch has not been shielded from the user terminal, the softswitch can not be surely kept away from evil attacks.

On the other hand, the method for implementing encoding/decoding or packet format conversion of a service packet between heterogeneous operating networks has not been expressly defined in related protocols of the ETSI. Since network forms are different, the audio and video encoding/decoding modes which are used by heterogeneous operating networks to transmit voices and images over the IP network are generally different. For example, the fixed network operating networks usually adopt such audio encoding/decoding mode as G.711 and G.729, while 3G mobile network operating networks often adopt AMR encoding/decoding mode. It is impossible to implement inter-working of audio or video packages contained in IP packets between heterogeneous operating networks without appropriate encoding/decoding or packet format conversion.

In order to ensure the security of the softswitch, the address information of the softswitch is generally shielded from the user terminal by a Session Border Controller (SBC). FIG. 3 is a schematic diagram illustrating the networking of an SBC in the related art. In FIG. 3, the bidirectional dash-dotted line represents media flows, the bidirectional dashed line represents signalling flows, and the bidirectional real line represents the Internet data flows. The SBC usually supports call proxy functions of such protocols as SIP, H.323, MGCP and so on, and may be regarded as the softswitch by the user terminal. The registration and call messages of the user terminal are forwarded to the softswitch after the signalling processing of the SBC. For the softswitch, the SBC can be regarded as the user terminal. The request for calling a called terminal is forwarded to the called terminal by the softswitch after the signalling processing of the SBC.

The SBC obtains such information as address change and bandwidth requirement of this session via performing signalling processing for a message from the user terminal or the softswitch, and determines whether the media flows are allowed to pass through according to such information as the current network resource occupation, thereby protecting the network.

In FIG. 3, for example, in one session, various signallings will carry address information in the payload of a protocol message in an interaction stage and implement a message response according to the address information. Moreover, the address information and port information of media flow channel of this session are dynamic information which is negotiated and generated via signalling interactions and will be carried in the payload of the protocol message as well. Common NAF does not prform processing for the address information in these IP payloads, therefore, a service bearer can not be established correctly. The SBC device, however, analyses the contents of the protocol message and performs appropriate processing for the address information thereof, which assures the normal establishment of the bearer and implements correct traversal of IP service packets between the user terminal, the SBC, the softswitch, and the called terminal.

The SBC may implement signalling proxy functions of such protocols as SIP, H.323, MGCP and so on. However, since the SBC is located near the border of an access network, it provides poor support for a control protocol used by large gateways, such as H.284, In addition, such problems as encoding/decoding or packet format conversion of a service packet between heterogeneous operating networks is not considered in the SBC. As a result, in a networking application, it is still needed to employ other devices to implement the encoding/decoding or packet format conversion of a service packet in the IP payload.

As can be seen from the related art, each existing solution solves only individual problems of inter-working between IP domains, and a complete technique and networking solution has not been presented. In order to implement the inter-working between IP domains, it is needed to add extra devices which may solve the remained issues of inter-working between IP domains. In this way, on one hand, the complexity of networking and the investments for devices may be increased; on the other hand, the delay between devices may be brought in,

SUMMARY OF THE INVENTION

The embodiments of the present invention provide an IP inter-working gateway in the NGN and a method for implementing inter-working between IP domains by an IP inter-working gateway.

An Internet Protocol (IP) inter-working gateway in a Next Generation Network (NGN) includes:

a transport layer module which complies with the definition of a standard Transmission Control Protocol/Internet Protocol (TCP/IP) protocol stack, for determining a service type of an IP packet from a source IP domain, and transmitting the IP packet to a service module or to a destination IP domain;

the service module, for performing processing of signaling proxy, Real Time Transport Control Protocol (RFCP) and media conversion and/or processing of control protocol for the IP packet from the transport layer module, and transmitting the IP packet processed by the service module to the destination IP domain.

A method for implementing inter-working between Internet Protocol (IP) domains by an IP inter-working gateway set between IP domains includes:

determining a service type of an IP packet, performing processing for the IP packet according to the service type of the IP packet, and transmitting the IP packet processed to a destination IP domain upon receiving an IP packet from a source IP domain.

As can be seen from the above, the embodiments of the present invention provide an IP inter-working gateway for implementing inter-working between IP domains. Merely by way of an example, the IP inter-working gateway may comply with the NGN architecture in which the bearer and control are separated, and establish a bearer under the control of the softswitch, ensure that operating networks may filter IP packets from other IP domains by configuring an Access Control List (ACL) and firewall filtering rules, implement the IP QoS control on each media flow under the control of the softswitch and realize the service differentiation of hierarchical users, implement such functions as cross-domain allocation of IP address, NAT, NAT traversal (i.e., the SBC function), audio and video encoding/decoding conversion, packet format conversion of a service packet between heterogeneous operating networks, re-initiation of a Real-time Transport Control Protocol (RTCP) packet, and so on.

In an embodiment, the IP inter-working gateway includes: a physical layer module, a link layer module and an IP layer module which comply with the definition of a standard TCP/IP protocol stack; a transport layer module which also complies with the definition of the standard TCP/IP protocol stack, for determining a service type of an IP packet from a source IP domain, and sending IP packets of different services to a service module or to a destination IP domain; the service module and an ACI, and firewall module. For example, the service module includes: a signalling proxy module for implementing the SBC function; an RFCP and media conversion module for implementing audio and video encoding/decoding conversion, packet format conversion of an IP packet between heterogeneous operating networks, and re-initiation of an RTCP packet; a control protocol processing module, complying with the NGN architecture in which the bearer and control are separated, for implementing such functions as establishing a bearer under the control of the softswitch, performing the IP QoS control under the control of the softswitch, cross-domain allocation of an IP address and NAT for each media flow. The ACI, and firewall module is used for filtering the IP packet from other IP domains. For another example, the service module further includes a dynamic routing module, for implementing preferred selection of a local IP address based on a dynamic routing protocol. Merely by way of an example, the IP inter-working gateway further includes four rule tables, i.e., a filtering rule table for storing filtering rules, a proxy rule table for storing proxy rules of the IP packet needing to be performed processing of signalling proxy, a routing rule table for storing transmission routing of an IP packet and a transmission rule table for storing transmission rules of an IP packet.

In an embodiment, the procedure of processing an IP packet accessing the IP inter-working gateway includes the following processes. The physical layer and link layer transmit the IP packet to the ACL and firewall module after receiving the IP packet and determining that the IP packet is a normal packet. The IP packet which has passed through the ACL and firewall module is transmitted to the transport layer module. The transport layer forwards the IP packet needing to be performed the processing of the signalling proxy to the signalling proxy module according to the proxy rules in the proxy rule table, while the IP packet which does not need to be performed the processing of the signalling proxy is further determined whether the IP packet is an IP packet for bearing service according to the filtering rule table. If the IP packet is an IP packet for bearing service and needs to be performed packet format or encoding/decoding conversion according to the transmission rule table, the IP packet is transmitted to the RTCP and media conversion module. If the IP packet is not an IP packet for bearing service, the IP packet based on such gateway control protocol as Media Gateway Control Part (MGCP), H.248, H.323 is transmitted to the control protocol processing module according to a destination address and port number in the IP packet. In another embodiment, if a dynamic routing module exists in the IFP inter-working gateway, the IP packet based on the dynamic routing protocol is transmitted to the dynamic routing module. Eventually, the IP packet processed by the service module is transmitted to the destination IP address from the IP layer and link layer according to the transmission rules in the transmission rule table.

As a single IP inter-working device, the IP inter-working gateway follows related standards of the ETSI in the establishment and control of a bearer, moreover, it has the SBC function, and may perform packet format or encoding/decoding conversion of an IP packet, thereby solving a series of issues, such as the establishment of a bearer between IP domains, encoding/decoding or packet format conversion, NAT and its traversal, security, and QoS and so on. The IP inter-working gateway may perform different processing for IP packets of various services, and implement the inter-working of an IP packet between heterogeneous operating networks, so as to assure the security of the softswitch, reduce the complexity of networking, and lower the investments for devices.

Additionally, the IP inter-working gateway may also have a preferred function of a local IP address based on the dynamic routing protocol, which may ensure that the forwarding path of the IP packet from the IP inter-working gateway to the destination is optimum, thereby improving the transmission quality of the IP packet.

DETAILED DESCRIPTION OF THE INVENTION

Figure 1:
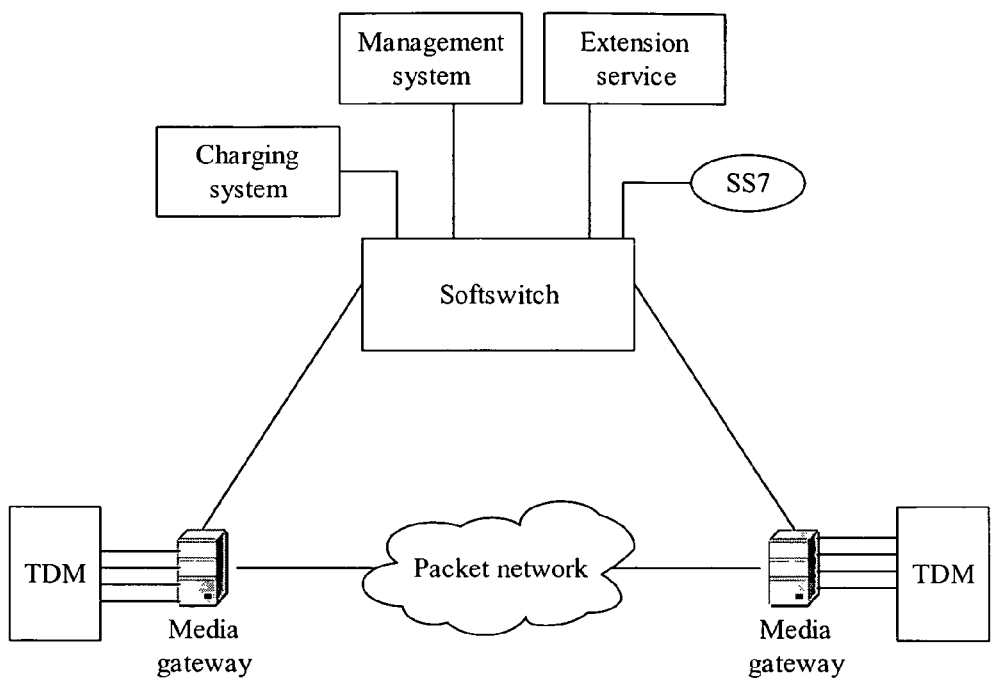
FIG. 1 is a schematic diagram illustrating a structure of the conventional NGN.
Figure 2:
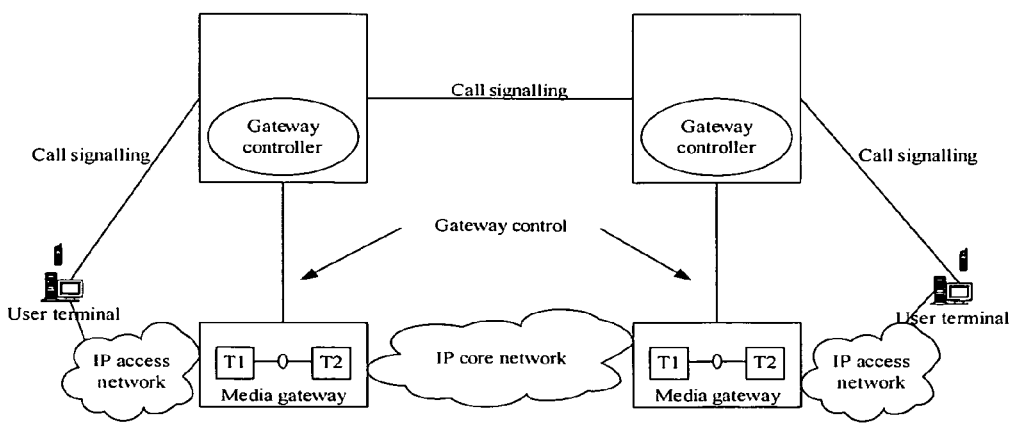
FIG. 2 is a schematic diagram illustrating the networking of pure IP inter-working devices defined by ETSI.
Figure 3:
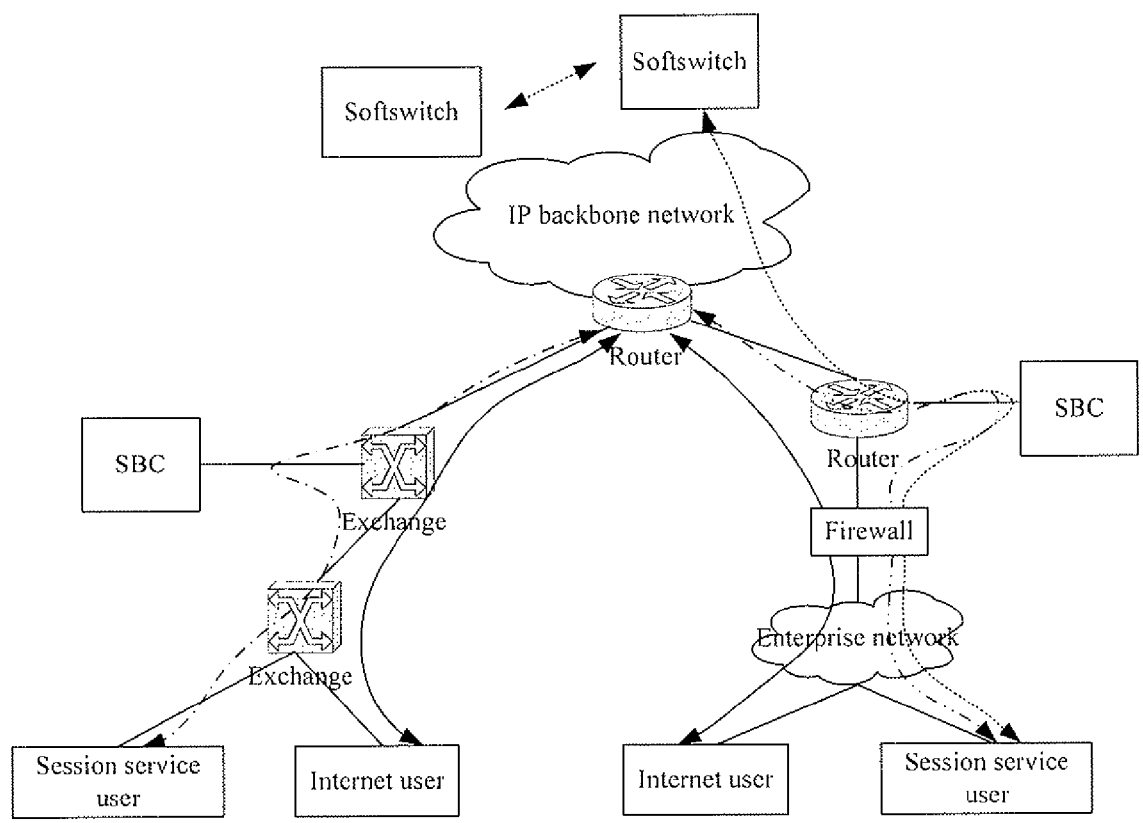
FIG. 3 is a schematic diagram illustrating the networking of an SBC in the related art.

The embodiments of the present invention include: setting an IP inter-working gateway between IP domains; after receiving an IP packet from a source IP domain, the transport layer module in the IP inter-working gateway determines a service type of the IP packet and transmits the IP packet to a service module in the IP inter-working gateway for corresponding processing. The IP inter-working gateway transmits the IP packets processed by the service module to a destination IP domain or directly transmits the IP packets of different service types to the destination IP domain.

Preferred embodiments of the present invention are hereinafter described in details with reference to the accompanying drawings to further clarify technical scheme and advantages of the present invention.

In the NGN, there are a great number of interactions of IP packets among between mobile operating network, fixed operating network and traditional ISP operating network. Similarly, there are also a great many interactions of IP packets between different mobile operating networks, different fixed operating networks and different ISP operating networks. In order to implement the interactions of heterogeneous IP packets between different IP networks, as an embodiment of the present invention, an IP inter-working gateway is set between different IP networks to implement the inter-working between IP domains.

As an independent IP inter-working device, The IP inter-working gateway in accordance with the embodiments of the present invention follows related standards of the ETSI in the establishment and control of a bearer, and it has the SBC function, and may perform packet format or encoding/decoding conversion of an IP packet, thereby solving a series of issues, such as the establishment of a bearer between IP domains, encoding/decoding or packet format conversion, NAT and its traversal, security, and QoS, and so on. As a single device, compared with possible networking of multiple devices in the related art, the IP inter-working gateway has advantages of simple networking architecture, reducing delay between devices, saving cost. in an example, the IP inter-working gateway may preferably select a local IP address according to routing rules to improve the transmission quality of the IP packet.

Merely by way of an example, the functions of the IP inter-working gateway include: complying with the NGN architecture in which the bearer and control are separated, and establishing a bearer under the control of the softswitch; ensuring that operating networks may filter IP packets from other IP domains by configuring an ACL and firewall filtering rules; implementing the IP QoS control on each media flow under the control of the softswitch and realizing the service differentiation of hierarchical users; performing cross-domain allocation of an IP address, NAT, NAT traversal (i.e., the SBC function), audio and video encoding/decoding conversion, packet format conversion of an IP packet between heterogeneous operating networks, re-initiation of an RTCP packet and the like. In another example, the IP inter-working gateway may also have a preferred function of the local IP address based on the dynamic routing protocol.

Figure 4:
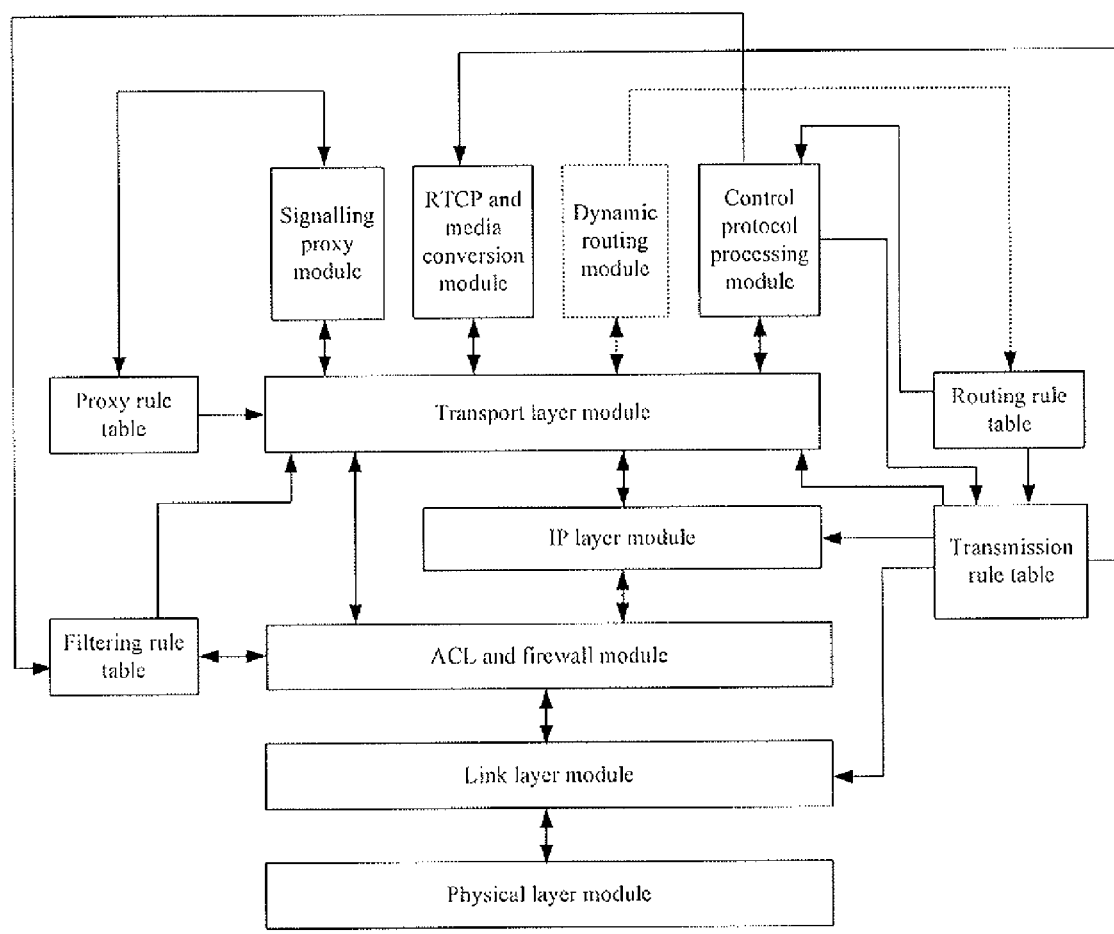
FIG. 4 is a schematic diagram illustrating the architecture of the IP inter-working gateway in accordance with an embodiment of the present invention.

FIG. 4 is a schematic diagram illustrating the architecture of the IP inter-working gateway in accordance with an embodiment of the present invention. In an example, the IP inter-working gateway follows the related standards of the ETSI in the establishment and control of a bearer, and includes common modules complying with the definition of the standard TCP/IP protocol stack, i.e., a physical layer module, a link layer module, and an IP layer module. In another example, the IP inter-working gateway further includes: a transport layer module, also complying with the definition of the standard TCP/IP protocol stack, for determining a service type of a normal IP packet from a source IP domain and transmitting IP packets of different services to a service module or to a destination IP domain; the service module includes a signalling proxy module, an RTCP and media conversion module and a control protocol processing module, for performing processing of signalling proxy, RTCP and media conversion, and processing of gateway control protocol for the IP packet from the transport layer module. The IP packet processed by the service nodule is transmitted to the destination IP domain. The structure of the IP inter-working gateway are specifically described as follows.

Merely by way of an example, the common physical layer module, link layer module, and IP layer module in the IP inter-working gateway comply with the definition of the standard protocol stack. Besides complying with the definition of the standard protocol stack, the transport layer module transmits the IP packet to the signalling proxy module after determining, according to the proxy rule table, that the IP packet needs to be performed the processing of the signalling proxy; or transmits the IP packet to the RTCP and media conversion module after determining, according to the filtering rule table, that the IP packet is an IP packet for bearing service, and determining, according to the transmission rule table, that the IP packet needs to be performed packet format or encoding/decoding conversion; or transmits the IP packet to the control protocol processing module after determining, according to the destination address information in the IP packet, that the IP packet is a gateway control packet such as H.248/H.323/MGCP packet; or transmits the IP packet to the destination IP domain after modifying, according to the transmission rule table, the source address information and destination address information in the IP packet.

Each component of the IP inter-working gateway in the embodiments of the present invention is hereinafter illustrated in detail.

First part: a service module, an ACL and firewall module.

1) the signalling proxy module for implementing the SBC function.

As an example, in service applications of the NGN, various signallings will carry address information in the payload of a protocol message in an interaction stage and implement a message response according to the address information. Moreover, the address information and port information of media flow channel are dynamic information which is negotiated and generated via signalling interaction and may be carried in the payload of the protocol message as well. The signalling proxy module in the IP inter-working gateway processes the address information in the payload of an IP packet to enable the signalling and media interaction to be performed between correct source address and destination address. For example, the signalling proxy module changes the address information in the payload of the IP packet to its own address information, changes the destination address information to the address information of the softswitch, and then forwards the IP packet to the softswitch. Merely by way of an example, the address information mentioned here includes an IP address, a port number and so on.

2) the RTCP and media conversion module for implementing audio and video encoding/decoding conversion, packet format conversion of an IP packet between heterogeneous operating networks, and re-initiation an RTCP packet.

Since network forms are different, the audio and video encoding/decoding mode which is used by heterogeneous operating networks to transmit the audio and image over the IP network is generally different. For example, fixed operating networks usually adopt such audio encoding/decoding mode as G.711, G.729, while 3G mobile operating networks often adopt AMR encoding/decoding mode. The audio and video package contained in the IP packets between heterogeneous operating networks may not implement inter-working between different IP domains unless it is performed appropriate encoding/decoding or packet format conversion by the RTCP and media conversion module. Generally, in order to improve the QoS, in 3G operating network, a User Plane (UP) frame header is added to the encoded audio or video package and then standard IP encapsulation is performed, while the IP packet from the fixed operating network has no UP frame header. Thus the inter-working of an IP packet between the fixed operating network and the mobile operating network can be implemented by deleting or adding a UP frame header.

Merely by way of example, the bearer of packet payload of audio and video over the IP uses the Real-time Transport Protocol (RTP) and adopts an encapsulation format of IP header+User Datagram Protocol (UDP) header+packet payload. The RTCP protocol is a quality monitoring protocol for the RTP transmission. Since the number of bytes of RTP load and the number of RTP packages in the IP packet may be respectively different from the original one after encoding/decoding or packet format conversion of a service packet between heterogeneous operating networks, it is needed to recalculate and generate a statistic report of the RTCP packet on the IP inter-working gateway through the RTCP protocol of the RTCP and media conversion module to reflect real network transmission quality. Refer to multiple existing implementing manners for the detailed implementation of the RTCP and media conversion module. It should be noted that the IP inter-working gateway may implement the audio and video encoding/decoding conversion, packet format conversion of an IP packet between heterogeneous operating networks, and re-initiation of an RTCP packet, thereby implementing the inter-working of the IP packet between heterogeneous operating networks.

3) the control protocol processing module for implementing such functions as complying with the NGN architecture in which the bearer and control are separated, performing cross-domain allocation of a local IP end point under the control of the softswitch to establish a bearer and set IP QoS control information of the IP packet for bearing service and filtering rules of a remote IP address and port number, and performing the NAT.

The NGN architecture in which the bearer and control are separated has been a trend in the construction of telecom networks. The IP inter-working gateway, as a specific device form of the MG, has to support the MG to perform signalling processing and be subject to the control of the softswitch.

Under the control of the softswitch, the IP inter-working gateway performs the IP QoS control for each media flow, namely sets a VLAN label, an MPLS label, and a DSCP field of an IP header so as to implement the service differentiation of hierarchical uers. The above function follows the related standards of the ETSI.

Since the IP inter-working gateway inter-works with multiple IP domains simultaneously, it is needed to determine an IP domain to inter-work when an IP end point is allocated so as to select a correct local address. As an example, the IP network inside an operating network may adopt a private network address such as an A class address in network section 10. When different operating networks inter-work with each other, it is needed to convert the private network address to a public network address and then to the private network address again to implement the inter-working. The above function follows the related standards of ETSI.

4) the ACL and firewall module for filtering an IP packet from other IP domains.

Since there are various security troubles in the IP network, the operating network often distrusts IP packets from other IP domains. It is thus needed to configure ACL and firewall filtering rules on the IP inter-working gateway to discard illegal packets. Additionally, when an IP end point is added to the IP inter-working gateway, it is under the control of the softswitch and on the bearer channel established successfully that an IP packet from a remote end point is accepted, that is, the function of pinhole firewall is configured.

In an example, the IP inter-working gateway may further include a dynamic routing module for implementing preferred selection of a local IP address based on the dynamic routing protocol. The transport layer module in the IP inter-working gateway transmits an IP packet to the dynamic routing module after determining that the IP packet is a routing protocol packet according to destination address information contained in the IP packet.

In full IP inter-working applications, the dynamic routing module supports the dynamic routing protocol to obtain routing information of the whole network in real time. When an IP end point is added under the control of the softswitch, the dynamic routing module allocates a local egress port and a source IP address which best match with a routing relationship according to a peer IP address and a local routing table. Thus, when the IP packet is transmitted locally to the destination, the forwarding path passed by the IP packet will be an optimum path, thereby improving the transmission quality of the IP packet. The above mentioned has not been considered by such standardization organization as ETSI and International Telecommunications Union Telecommunication Standardization Sector (ITU-T).

Second part: four rule tables.

1) the filtering rule table for storing filtering rules.

Merely by way of an example, the indexes of the filtering rule table are the remote IP address and port number which allow the transmitted IP packet to access the IP inter-working gateway. In an example, the filtering rule table is maintained and updated by two modules, i.e., the ACL and firewall module and the control protocol processing module. The ACL and firewall module maintains the filtering rule table according to manual configuration information, sets a remote IP address and port number which are allowed to access the IP inter-working gateway, and identifies the remote IP address and port number as a address not for bearing service generated by manual configuration. The control protocol processing module, according to the standard procedure of the ETSI and an instruction of the softswitch, replaces information in the filtering rule table with a remote IP address and port number, and identifies the remote IP address and port number as an address for bearing service generated by processing of gateway control signalling so as to enable the IP packet on a legally established bearer to be processed normally, thereby implementing functions of a pinhole firewall. The detailed implementation of the pinhole firewall belongs to the related art, therefore there is no more description here.

2) the proxy rule table for implementing proxy processing for the IP packet needing to be performed the processing of the signalling proxy.

Merely by way of an example, the proxy rule table is updated by the signalling proxy module according to manual configuration information or processing of signalling proxy, and the transport layer module determines whether to transmit the IP packet received to the signalling proxy module for processing according to the proxy rule table.

The proxy rule table records a local IP address and port number allowed to be used by the IP inter-working gateway as signalling proxy and the proxy rules about how to replace the IP address and port number in the IP header, transport layer header and payload of an IP packet when an IP packet is received at this IP address and port number. If the destination IP address and port number in the IP packet are respectively the same as the local IP address and port number recorded in the proxy rule table and allowing to be used by the IP inter-working gateway as signalling proxy, corresponding replacement processing will be performed for the IP address and port number in the IP packet according to the proxy rules corresponding to the local IP address and port number.

3) the routing rule table for storing the transmission routing of the IP packet.

Merely by way of an example, the routing rule table may be generated by manual configuration. It uses the destination IP address as index, records egress ports or IP addresses used locally, and has no difference from a common routing table. Routing information in the routing rule table needed by the IP packet transmitted outwards by the IP inter-working gateway is synchronized to corresponding information in the transmission rule table to serve as transmission rules of the IP packet not for bearing service.

In an example, when a dynamic routing module exists in the IP inter-working gateway, the routing rule table may be generated by the dynamic routing module. The dynamic routing module updates the routing rule table according to routing information contained in the IP packet which is a routing protocol packet. The detailed implementation belongs to the related art and related protocols may be refered, so there is no more description here.

4) the transmission rule table for storing the transmission rules of the IP packet.

Merely by way of an example, some of routing information in the transmission rule table is from the routing rule table and needed when the IP inter-working gateway transmits IP packets outwards and is identified to transmit IP packets not for bearing service.

In an example, other routing information is transmission rules of an IP packet for bearing service, which is maintained by the control protocol processing module and whose indexes are the local IP address and port number having established a bearer, and it is used for recording the transmission rules after the control protocol processing module receives IP packets for bearing service. Since one local IP end point not only establishes a bearer relationship with a remote end point, but also connects in topology with another IP end point inside the IP inter-working gateway, the local IP end point and the remote end point may transmit IP packets to each other, synchronously, the local IP end point and another local IP end point may also transmit IP packets to each other, and there are two peer ends of transmission. The information of the two peer ends will respectively recorded in the transmission rule table, and the information includes an IP address and port number of the peer IP end point, the encoding/decoding type used by the peer IP end point, and the IP packet format, ie., whether there is a UP frame header Since the IP packet for bearing service is uni-directionally transmitted end-to-end, it is easy to determine that the peer end to which the IP packet will be transmitted is another local IP end point or the remote IP end point by determining that the source IP address of the received IP packet is that of another local IP end point or that of the remote IP end point. If the source IP address of the received IP packet is that of another local IP end point, the peer end to which the IP packet will be transmitted is the remote IP end point. If the source IP address of the received IP packet is that of the remote IP end point, the peer end to which IP packet will be transmitted is the local IP end point.

According to the standard procedure of the ETSI, for example in one session, when allocating a local IP end point according to the instruction of the softswitch, the control protocol processing module adds an item whose indexes are the local IP address and port number. The item records information when the peer end of transmission is a remote IP end point, and the information includes an IP address and port number of the remote IP end point, the used encoding/decoding type, IP packet format, i.e., whether there is a UP frame header, and the IP QoS control on output media flows which includes a VLAN label, an MPLS label, and a DSCP field of an IP header. The IP QoS control information is encapsulated in a corresponding field of an IP packet when the media flows are transmitted to the remote IP end point. At the same time, according to such gateway control protocols as H.148, H.323, MGCP, the softswitch records the encoding/decoding type and the packet format (i.e. whether there is a UP header) of a local IP end point in the transmission rule table. Similarly, when a second IP end point of this session of the IP inter-working gateway is added, corresponding information is recorded in the transmission rule table. And then, when the softswitch controls the two IP end points inside the IP inter-working gateway to perform topology connection, the control protocol processing module associates the related items of the two IP end points in the transmission rule table, respectively adding information of the IP end point whose peer end of transmission is another local IP end point to the transmission rule table, the information includes an IP address and port number of another local IP end point, the used encoding/decoding type, IP packet format, i.e., whether there is a UP frame header, and so on. In this way, it may be determined whether it is needed to be performed RTCP and media flow conversion by determining whether the encoding/decoding types and packet formats of the two IP end points are the same when the IP packet for bearing service is transmitted.

As can be seen from FIG. 4, the procedure of processing an IP packet from a source IP address of the source IP domain accessing the IP inter-working gateway includes the following processes. Merely by way of an example, the physical layer and the link layer transmit the IP packet to the ACL and firewall module after receiving the IP packet according to a protocol and determining that the IP packet is a normal packet. The IP packet which has passed through the ACL and firewall module is transmitted to the transport layer module. The transport layer forwards the IP packet needing to be performed the processing of the signalling proxy to the signalling proxy module according to the proxy rules of the proxy rule table, while the IP packet which does not need to be performed the processing of the signalling proxy is further determined whether it is an IP packet for bearing service according to the filtering rule table. If the IP packet is an IP packet for bearing service and needs to be performed the packet format or encoding/decoding conversion according to an instruction of the transmission rule table, the IP packet is transmitted to the RTCP and media conversion module. If the IP packet is not an IP packet for bearing service, the IP packet based on the gateway control protocol is transmitted to the control protocol processing module according to a destination IP address and port number contained in the IP packet. In an example, if there is a dynamic routing module in the IP inter-working gateway, the IP packet based on the dynamic routing protocol is transmitted to the dynamic routing module. Eventually, the IP packet processed by the service module is transmitted to the IP layer module via the transport layer module, and then transmitted to the link layer module according to the transmission rules in the transmission rule table after passing through the ACL and firewall module, eventually transmitted from the link layer to the destination IP address in the destination IP domain via the physical layer module according to the transmission rules in the transmission rule table. Hereinafter, the sources IP address in the source IP domain is called source IP domain for short, while the destination IP address in the destination IP domain is called destination IP domain for short.

Figure 5:
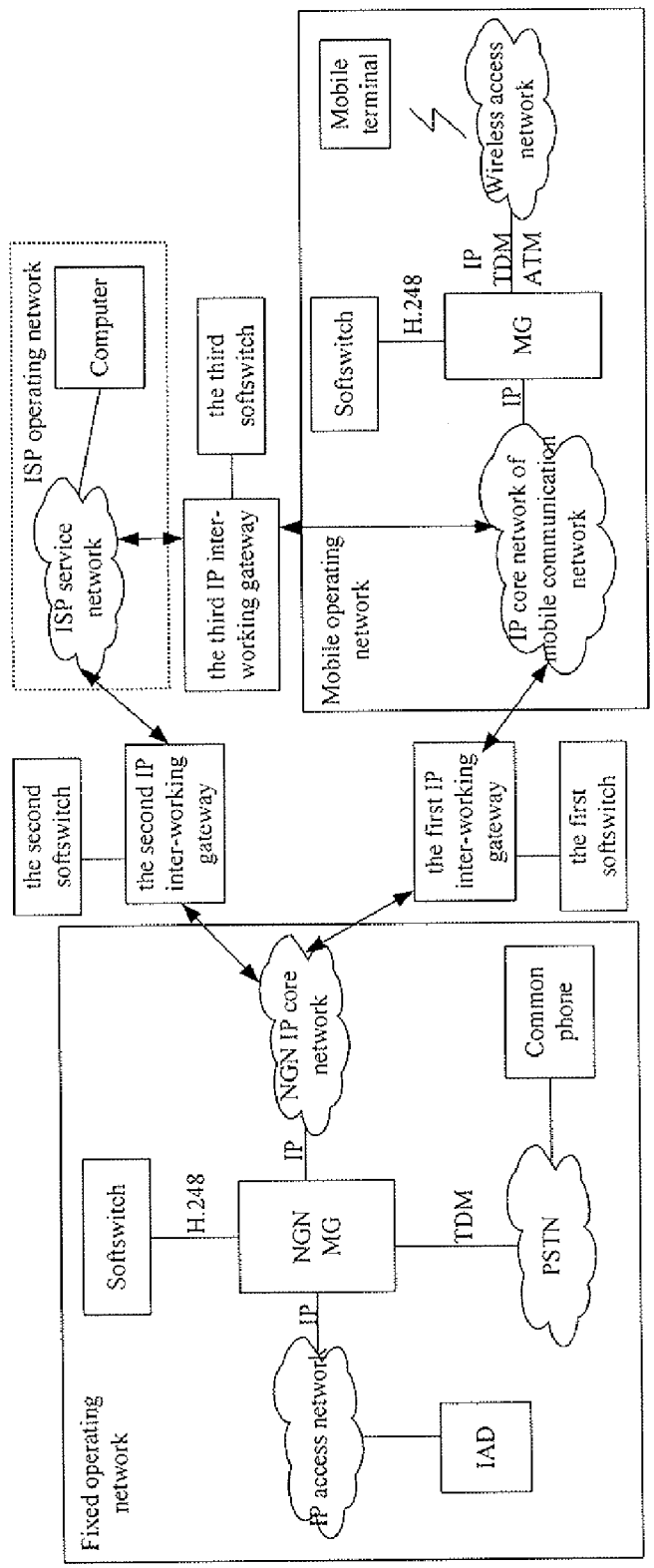
FIG. 5 is a schematic diagram illustrating the networking of the IP inter-working gateway applied between operating networks providing heterogeneous services in accordance with an embodiment of the present invention.

An application of the IP inter-working gateway in accordance with an embodiment of the present invention is hereinafter described in detail with reference to FIG. 5. FIG. 5 is a schematic diagram illustrating the networking of the IP inter-working gateway applied between operating networks providing heterogeneous services in accordance with the present embodiment of the invention, and applications in different operating networks providing the homogeneous services are similar as that in FIG. 5. In FIG. 5, a first IP inter-working gateway and a first softswitch controlling the first IP inter-working gateway are set between a fixed operating network and a mobile operating network. A second IP inter-working gateway and a second softswitch controlling the second IP inter-working gateway are set between the fixed operating network and an ISP operating network. A third IP inter-working gateway and a third softswitch controlling the third IP inter-working gateway are set between the mobile operating network and the ISP operating network.

As an example, the application of the IP inter-working gateway is hereinafter described with reference to the procedure of the IP inter-working gateway implementing the inter-working between a mobile user terminal and a fixed user terminal under the control of the softswitch. In FIG. 5, it is assumed that a fixed user terminal, e.g., an Integrated Access Device (IAD) or a common phone, calls a mobile user terminal. After determining the called user is a mobile user, the softswitch of the fixed operating network transmits a signalling to the softswitch of the first IP inter-working gateway. After receiving the signalling, the softswitch instructs the first IP inter-working gateway to allocate an IP end point to establish a bearer with the fixed operating network and notifies the first IP inter-working gateway to record the encoding/decoding type and related information in the IP packet. After determining the called user is a mobile user, the first softswitch transmits a signalling to the softswitch of the mobile operating network. The softswitch of the mobile operating network allocates and returns a local IP address and port number to the first softswitch. According to the local IP address and port number, the first softswitch instructs the first IP inter-working gateway to allocate an IP end point to establish a bearer with the mobile operating network and notifies the first IP inter-working gateway to record the encoding/decoding type and related information in the IP packet. The two end points of the first IP inter-working gateway are connected by the first softswitch. Thus, both the two bearers between the IP inter-working gateway and the two networks and the internal topology connection have been established. When there is an IP packet interaction between the fixed user terminal of the fixed operating network and the mobile user terminal of the mobile operating network and the IP packet passes through the first IP inter-working gateway, the first IP inter-working gateway processes the received IP packet, namely, differentiates the IP packets passing through the ACL and firewall module, and transmits the IP packet according to the established internal topology after determining that the IP packet is processed correspondingly by the service module, The detailed procedure is as shown in FIG. 6.

Figure 6:
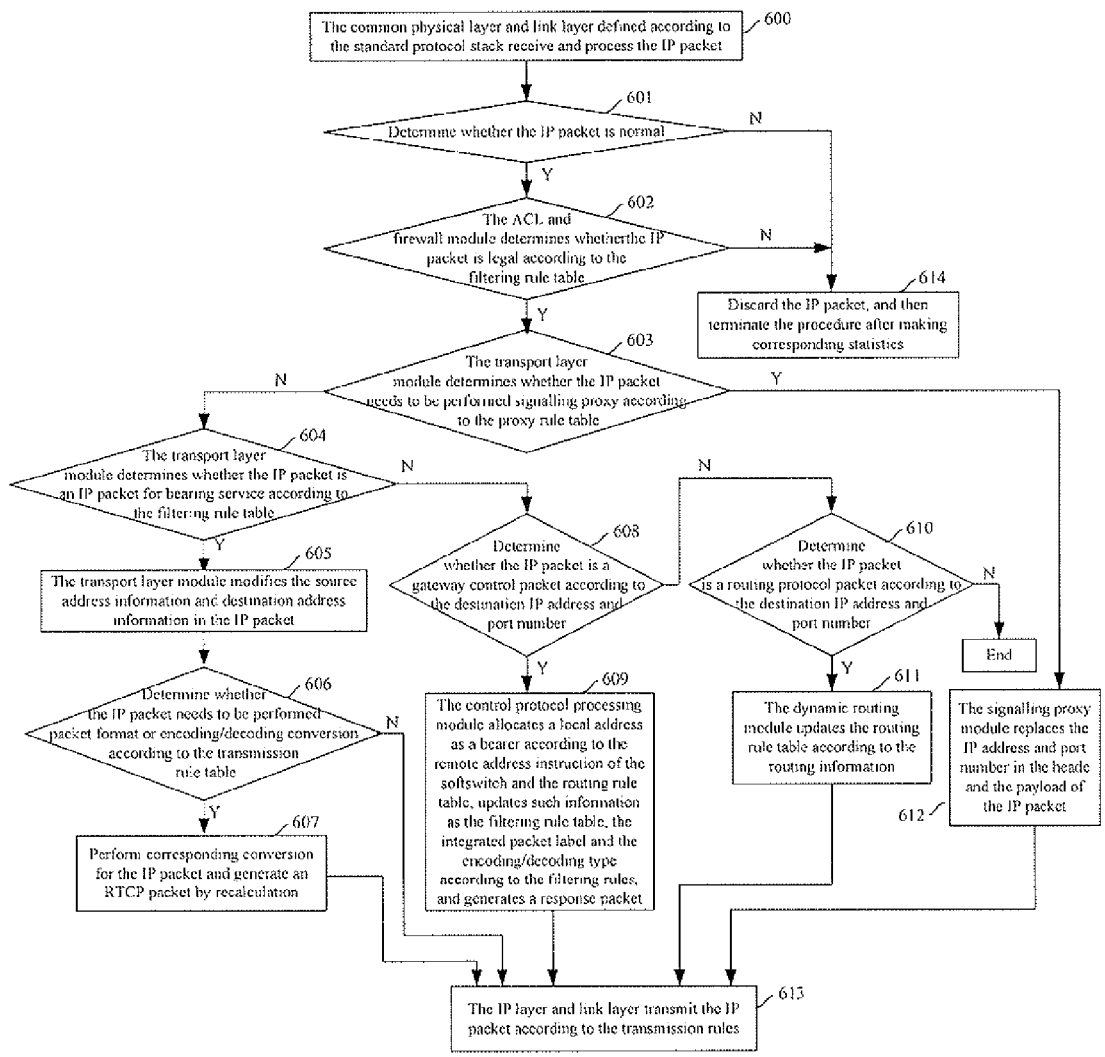
FIG. 6 is a flow chart of processing an IP packet by the IP inter-working gateway in accordance with an embodiment of the present invention.

FIG. 6 is a flow chart of processing an IP packets by the IP inter-working gateway in accordance with an embodiment of the present invention. Merely by way of an example, the IP packet accessing the IP inter-working gateway is generally categorized in four types: an IP packet for bearing service, i.e., a media flow, a gateway control packet such as a H.248/H.323/MGCP packet, a signalling proxy packet, and a routing protocol packet. Wherein the gateway control packet, signalling proxy packet and routing protocol packet are generally referred to as an IP packet not for bearing service, while the media flow is also called the IP service packet. An IP inter-working gateway is set between IP domains, and the method mainly includes the following processes. After receiving an IP packet from a source IP domain, the transport layer module in the IP inter-working gateway determines a service type of the IP packet and transmits the IP packet to a service module in the IP inter-working gateway for processing or to the destination IP domain (referring to Steps 600 to 612 for the details). The IP inter-working gateway transmits the IP packet processed by the service module to the destination IP domain (referring to Step 613 for the details). Suppose that the dynamic routing module has been set in the IP inter-working gateway, the method in accordance with an embodiment of the present invention includes the following steps.

Steps 600 to 601: when an IP packet passes through the IP inter-working gateway, the common physical layer and link layer defined according to the standard protocol stack receive the IP packet and determine whether the IP packet is normal. If the IP packet is normal, the IP packet is forwarded to the ACL and firewall module and then perform Step 602; otherwise, perform Step 614.

The implementation of the above steps complies with specifications of related protocols; therefore there is no more description here.

Step 602: the ACL and firewall module determines whether the IP packet is legal according to the filtering rule table. If the IP packet is legal, the IP packet is forwarded, directly or via the IP layer module, to the transport layer module (referring to FIG. 4) and then perform Step 603; otherwise, perform Step 614.

In this step, the ACL and firewall module reads the filtering rules from the filtering rule table and filters the IP packet according to the filtering rules. The implementation of filtering is a common technique for the skilled in the art, therefore there is no more description here. It should be noted that, if the filtering is performed according to the IP address and port number, the IP packet determined as legal is transmitted to the transport layer module directly; if the filtering is only implemented according to the IP address, the IP packet determined as legal is transmitted to the transport layer module directly via the IP layer module.

Step 603: the transport layer module determines whether the IP packet needs to be performed the processing of the signalling proxy according to the proxy rule table. If the IP packet needs to be performed the processing of the signalling proxy, perform Step 612. Otherwise, perform Step 604.

Merely by way of an example, the proxy rule table has recorded a local IP address and port number allowed to be used by the IP inter-working gateway as signalling proxy and the proxy rules about how to replace the IP address and port number in the IP and transport layer header and the payload of an IP packet after the IP packet is received at this IP address and port number. If the destination IP address and port number in the IP packet are respectively the same as the local IP address and port number allowed to be used by the IP inter-working gateway as signalling proxy, determine that the IP packet needs to be performed the processing of the signalling proxy. Otherwise, determine that the IP packet does not need to be performed the processing of the signalling proxy.

Steps 604 to 607: the transport layer module determines whether the IP packet is an IP for bearing service according to the filtering rule table, If it is an IP packet for bearing service, the transport layer module further determines whether the IP packet needs to be performed the packet format or encoding/decoding conversion according to the transmission rule table after modifying the source address information and destination address information in the IP packet. If the IP packet needs to be performed the packet format or encoding/decoding conversion, the RTCP and media conversion module performs corresponding conversion for the IP packet, generates an RTCP packet by recalculation, and then perform Step 613; if the IP packet does not need to be performed the packet format or encoding/decoding conversion, perform Step 613. If the IP packet is not the IP packet for bearing service, perform Step 608.

In this step, the transport layer module reads the transmission rules from the transmission rule table, and forwards the IP packet to the RTCP and media conversion module for corresponding processing after determining the IP packet is an IP packet for bearing service and needs to be performed the packet format or encoding/decoding conversion according to the read transmission rules.

Merely by way of an example, determining whether the IP packet is an IP packet for bearing service may includes: if the source IP address and port number of the IP packet are respectively the same as the legal remote IP address and port number stored in the filtering rule table by the control protocol processing module according to the standard procedure of the ETSI and the instruction of the softswitch, determining that the IP packet is an IP packet for bearing service.

For the IP packet for bearing service, the transport layer module replaces the source address information in the IP packet with the address information of another local end point in the transmission rule table and replaces the destination address information in the IP packet with the address information of the remote end point used for establishing a bearer with another local end point in the transmission rule table. Merely by way of an example, the address information herein includes an IP address and port number.

Searching for a record whose local IP address and port number recorded in the transmission rule table according to the standard procedure of the ETSI are respectively the same as the destination IP address and port number contained in the IP packet. If the record instructs that the encoding/decoding types or packet formats of the two IP end points corresponding to the IP packet are different, determine that the IP packet needs to be performed the packet format or encoding/decoding conversion. Otherwise, determine that the IP packet does not need to be performed packet format or encoding/decoding conversion.

Steps 608 to 609: the transport layer module determines whether the IP packet is a gateway control packet according to the destination IP address and port number in the IP packet. If the IP packet is a gateway control packet, the IP packet is forwarded to the control protocol processing module for corresponding processing and then perform Step 613. Otherwise, perform Step 610.

In this step, if the destination IP address and port number in the IP packet is the IP address and port number corresponding to the gateway control packet specified by the transport layer module, determine that the IP packet is a gateway control packet. Here, the IP address and port number corresponding to the gateway control packet specified by the transport layer module include public or privately defined ones, referring to the related definitions of the transport layer protocol. The gateway control packet here refers to the H.248 packet, H.323 packet, MGCP packet, and the like.

The corresponding processing performed by the control protocol processing module includes: allocating a local IP end point as a bearer according to the routing rule table and the remote IP address and port number from the softswitch carried in the payload of the gateway control packet. The IP address of the IP end point is a local address preferably selected according to the routing rule table, thereby reducing the transmission delay of the IP packet. The corresponding processing performed by the control protocol processing module also includes updating such information as the filtering rule table, the integrated packet label, and the encoding/decoding type according to the remote IP address and port number, updating the transmission rule table, and then generating a response packet to be transmitted to the softswitch.

Steps 610 to 611: the transport layer module determines whether the IP packet is a routing protocol packet according to the destination IP address and port number of the IP packet. If the IP packet is a routing protocol packet, the dynamic routing module updates the routing rule table according to the routing information contained in the IP packet and generates a response packet according to the routing protocol, and then perform Step 613; otherwise, terminate the current procedure.

In this step, if the destination IP address and port number of the IP packet are the IP address and port number corresponding to the routing protocol packet specified by the transport layer module, determine that the IP packet is a routing protocol packet. The dynamic routing module updates the routing information in the routing rule table according to the routing information contained in the IP packet and generates a response packet according to the routing protocol. Here, the IP address and port number corresponding to the routing protocol packet specified by the transport layer module includes public or privately defined ones, referring to the related specifications of the transport layer.

Step 612: the signalling proxy module performs corresponding replacement procrssing for the IP address and port number in the IP packet header and the payload of the IP packet and then terminates the current procedure.

The transport layer module reads the proxy rules from the proxy rule table and performs replacement processing for the corresponding information in the IP packet according to the proxy rules.

Step 613: the IP packet processed by the service module is transmitted to the destination IP domain from the IP layer and link layer according to the transmission rules in the transmission rule table, then terminate the current procedure.

Merely by way of an example, different IP packets are transmitted according to different transmission rules in the transmission rule table. The IP packet for bearing service is transmitted according to the transmission rules of an IP packet for bearing service. The IP packet not for bearing service is transmitted according to the transmission rules of an IP packet not for bearing service. For example, the IP packets from the control protocol processing module, the signalling proxy module, and the dynamic routing module are the IP packets not for bearing service, while the IP packet from the RTCP and media conversion module is the IP packet for bearing service.

It should be noted that the IP packet from the dynamic routing module needing to be transmitted is a response packet.

Step 614: discard the IP packet and make a corresponding statistics.

The statistics mentioned herein refers to counting discarded IP packets.

It can be seen from the method according to the embodiments of the present invention, in the IP inter-working gateway provided, different IP packets will be performed different processing, which may assure the security of the softswitch, reduce the complexity of networking, and lower the investments for devices.

The foregoing is only preferred embodiments of the present invention and is not for use in limiting the present invention, any modification, equivalent replacement or improvement made under the spirit and principles of the present invention should be included in the protection scope of the present invention.

What is claimed is:

1. An Internet Protocol (IP) inter-working gateway between two different Internet Protocol (IP) domains of different types of IP networks in a Next Generation Network (NGN), comprising:
    a transport layer module which complies with the definition of a standard Transmission Control Protocol/Internet Protocol (TCP/IP) protocol stack, for determining a type of an IP packet from a source IP domain of a type of IP network, and transmitting the IP packet to a service module;
    the service module, for performing processing of signalling proxy, Real Time Transport Control Protocol (RTCP) and media conversion and/or processing of control protocol for the IP packet from the transport layer module according to the type of the IP packet, and transmitting the IP packet processed by the service module to a destination IP domain of a different type of IP network;
    wherein the service module comprises:
        a signalling proxy module, for replacing source address information and destination address information in the IP packet according to proxy rules in a proxy rule table, wherein the IP packet needs the processing of the signalling proxy; an RTCP and media conversion module, for performing audio and video encoding/decoding conversion, packet format conversion of the IP packet between heterogeneous operating networks, and re-initiation of an RTCP packet for the IP packet, wherein the IP packet is an IP packet for bearing service and needs packet format or encoding/decoding conversion; and
        a control protocol processing module, for receiving the IP packet which is a gateway control packet, performing cross-domain allocation of a local IP end point under control of a softswitch to establish a bearer, setting IP Quality of Service (QoS) control on forwarding an IP packet for bearing service, setting filtering rules of a remote IP address and port number and performing processing of Network Address Translation (NAT);
    wherein the re-initiation of the RTCP packet for the IP packet comprises:
        terminating an original RTCP packet of the IP packet, recalculating and generating a statistic report of the RTCP packet.

2. The IP inter-working gateway according to claim 1, wherein the transport layer module is used for
    determining, according to the proxy rule table, that the IP packet needs the processing of the signalling proxy, and transmitting the IP packet to the signaling proxy module,
    determining, according to a filtering rule table, that the IP packet is an IP packet for bearing service and determining, according to a transmission rule table, that the IP packet needs the packet format or encoding/decoding conversion, and transmitting the IP packet to the RTCP and media conversion module,
    determining, according to the destination address information in the IP packet, that the IP packet is the gateway control packet, and transmitting the IP packet to the control protocol processing module, or
    transmitting, according to the transmission rule table, the IP packet to the destination IP domain after modifying the source address information and the destination address information in the IP packet.

3. The IP inter-working gateway according to claim 2, wherein the source address information and destination address information comprise an IP address and a port number.

4. The IP inter-working gateway according to claim 2, further comprising:
    an Access Control List (ACL) and firewall module, for filtering an IP packet from other IP domains according to the filtering rule table;

wherein an IP packet passing through the ACL and firewall module is transmitted to the transport layer module by the ACL and firewall module.

5. The IP inter-working gateway according to claim 4, wherein the filtering rule table is indexed by a remote IP address and port number allowed accessing the IP inter-working gateway and set by the ACL and firewall module according to manual configuration information, and is updated by the control protocol processing module using a remote IP address and port number used for establishing a bearer according to an instruction of the softswitch.

6. The IP inter-working gateway according to claim 1, wherein the service module further comprises a dynamic routing module which is used for updating a routing rule table storing routing information according to routing information in the IP packet, generating a response packet according to a routing protocol, and transmitting the response packet to the destination IP domain according to transmission rules in a transmission rule table, wherein the IP packet is a routing protocol packet.

7. The IP inter-working gateway according to claim 6, wherein the transport layer module is further used for determining, according to the destination address information in the IP packet, that the IP packet is the routing protocol packet, and transmitting the IP packet to the dynamic routing module.

8. The IP inter-working gateway according to claim 7, wherein the source address information and the destination address information comprise an IP address and a port number.

9. The IP inter-working gateway according to claim 7, further comprising:
an Access Control List (ACL) and firewall module, for filtering an IP packet from other IP domains according to the filtering rule table;
wherein an IP packet passing through the ACL and firewall module is transmitted to the transport layer module by the ACL and firewall module.

10. The IP inter-working gateway according to claim 9, wherein the filtering rule table is indexed with a remote IP address and port number allowed accessing the IP inter-working gateway and set by the ACL and firewall module according to manual configuration information, and is updated by the control protocol processing module using a remote IP address and port number used for establishing a bearer according to an instruction of the softswitch.

11. The IP inter-working gateway according to claim 1, wherein the signalling proxy module updates the proxy rule table according to manual configuration information or the processing of the signaling proxy.

12. The IP inter-working gateway according to claim 6, wherein the transmission rule table comprises transmission rules of an IP packet not for bearing service and transmission rules of an IP packet for bearing service;
the routing rule table storing the routing information is generated by manual configuration;
transmission rules of the IP packet not for bearing service in the transmission rule table are updated according to the routing information from the routing rule table needed when the IP inter-working gateway transmits the IP packet outwards; the tranmission rules of the IP packet for bearing service is added to the transmission rule table when the control protocol processing module allocates the local IP end point according to an instruction of the softswitch.

13. The IP inter-working gateway according to claim 12, wherein the transmission rules comprises items whose indexes are a local IP address and port number; the items comprises an IP address and a port number of a remote IP end point, a encoding/decoding type and an IP packet format, and IP QoS control of output media flow.

14. A method for implementing inter-working between two different Internet Protocol (IP) domains of different types of IP networks by an IP inter-working gateway set between IP domains, comprising:
determining a type of an IP packet, performing processing for the IP packet according to the type of the IP packet, and transmitting the IP packet processed to a destination IP domain of a type of IP network upon receiving the IP packet from a source IP domain of a different type of IP network;
wherein the processing for the IP packet comprises:
processing of signalling proxy, Real Time Transport Control Protocol (RTCP) and media conversion and/or processing of control protocol for the IP packet according to the type of the IP packet;
wherein said determining the service type of the IP packet and performing the processing for the IP packet, and transmitting the IP packet to the destination IP domain comprises:
determining whether processing of signalling proxy according to a proxy rule table needs to be performed on the IP packet; if processing of signalling proxy needs to be performed on the IP packet, replacing source address information and destination address information in the IP packet according to the proxy rule table, and transmitting the IP packet processed to the destination IP domain; otherwise,
if determining that the IP packet is an IP packet for bearing service and packet format or encoding/decoding conversion needs to be performed on the IP packet according to a filtering rule table and a transmission rule table respectively; performing audio and video encoding/decoding conversion, packet format conversion of the IP packet between heterogeneous operating networks, and re-initiation of an RTCP packet for the IP packet, and transmitting the IP packet processed to the destination IP domain;
if determining that the IP packet is an IP packet for bearing service and packet format or encoding/decoding conversion does not need to be performed on the IP packet, modifying the source address information and the destination address information in the IP packet and transmitting the IP packet to the destination IP domain;
if determining that the IP packet is not an IP packet for bearing service, determining whether the IP packet is a gateway control packet; if it is a gateway control packet, establishing a bearer, performing IP QoS control on forwarding the IP packet, across-domain allocation of an IP address and processing of Network Address Translation (NAT), and transmitting the IP packet processed to a destination IP domain; if it is not a gateway control packet, terminating the procedure.

15. The method according to claim 14, wherein said transmitting the IP packet processed comprises:
transmitting the IP packet processed to the destination IP domain according to transmission rules in a transmission rule table.

16. The method according to claim 14, further comprising:
before terminating the procedure, determining whether the IP packet, which is not the IP packet for bearing service and on which processing of signalling proxy does not need to be performed, is a routing protocol packet; if it is the routing protocol packet, updating routing information in a routing rule table according to routing information in the IP packet, transmitting a response packet generated according to a routing protocol to the destination IP domain, and terminating the procedure; if it is not a routing protocol packet, terminating the procedure.

17. The method according to claim 16, wherein said determining whether the IP packet is the routing protocol packet comprises:
    determining that the IP packet is the routing protocol packet if a destination IP address and port number in the IP packet are respectively an IP address and port number corresponding to an routing protocol packet specified by the IP inter-working gateway.

18. The method according to claim 16, further comprising:
    before determining whether the IP packet needs the processing of the signalling proxy, determineing whether the IP packet is normal when the IP packet passes through the IP inter-working gateway; if the IP packet is normal, determining, the service type of an IP packet passing through an Access Control List (ACL) and firewall module in the IP inter-working gateway, performing the processing for the IP packet and transmitting the IP packet to the destination IP domain; if the IP packet is abnormal, discarding the IP packet, and terminating the procedure after doing a statistics.

19. The method according to claim 14, wherein said determining whether the IP packet needs processing of signalling proxy comprises:
    if a destination IP address and port number in the IP packet are respectively the same as a local IP address and port number that are allowed to be used by the IP inter-working gateway as a signalling proxy and recorded in the proxy rule table, determining that processing of signalling proxy needs to be performed on the IP packet; otherwise, determining that the IP packet does not need the signalling proxy.

20. The method according to claim 14, wherein said determining whether the IP packet is the IP packet for bearing service and needs the packet format or encoding/decoding conversion comprises:
    determing that the IP packet is the IP packet for bearing service and needs the packet format or encoding/decoding conversion if a source IP address and port number in the IP packet are respectively the same as a remote IP address and port number stored in the filtering rule table according to a standard procedure of ETSI and an instruction of a softswitch;
    searching for a record whose a local IP address and port number recorded in the transmission rule table according to the standard procedure of ETSI are respectively the same as the destination IP address and port number in the IP packet; if the record instructs that encoding/decoding types or packet formats of the two IP end points corresponding to the IP packet are different, determining that the IP packet needs the packet format or encoding/decoding conversion; otherwise, determining that the IP packet does not need the packet format or encoding/decoding conversion.

21. The method according to claim 14, wherein said modifying the source address information and the destination address information in the IP packet comprises:
    replacing the source address information in the IP packet with address information of another local end point in the transmission rule table; replacing the destination address information in the IP packet with address information of a remote end point used for establishing a bearer with another local end point in the transmission rule table; wherein the address information comprises an IP address and a port number.

22. The method according to claim 14, wherein said determining whether the IP packet is a gateway control packet comprises:
    if a destination IP address and port number in the IP packet are respectively an IP address and a port number which are used by the gateway control protocol and recorded in the IP inter-workiong gateway, determining that the IP packet is a gateway control packet.

23. The method according to claim 14, further comprises:
    before determining whether the IP packet needs the processing of the signalling proxy, determineing whether the IP packet is normal when the IP packet passes through the IP inter-working gateway; if the IP packet is normal, determining, the service type of an IP packet passing through an Access Control List (ACL) and firewall module in the IP inter-working gateway, performing the processing for the IP packet and transmitting the IP packet to the destination IP domain; if the IP packet is abnormal, discarding the IP packet, and terminating the procedure after doing a statistics.

24. The method according to claim 14, wherein the source address information and the destination information comprise an IP address and a port number.

25. The method according to claim 15, wherein said transmitting the IP packet processed according to the transmission rules in the transmission rule table comprises:
    transmitting the IP packet for bearing service according to transmission rules of transmitting an IP packet for bearing service; transmitting the IP packet not for bearing service according to transmission rules of transmitting an IP packet not for bearing service.

26. The method according to claim 25, wherein the IP packet not for bearing service comprises one of an IP packet based on a gateway control protocol, an IP packet based on a dynamic routing protocol and an IP packet of a signalling related to call; the IP packet for bearing service is an IP packet containing user service data.

27. The method according to claims 21, wherein the source address information and the destination address information comprise an IP address and a port number.

* * * * *